US008120344B2

(12) United States Patent
Hoshino et al.

(10) Patent No.: US 8,120,344 B2
(45) **Date of Patent: *Feb. 21, 2012**

(54) POWER SUPPLY UNIT AND PORTABLE DEVICE

(75) Inventors: Taichi Hoshino, Kanagawa (JP); Hiroki Kikuchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 843 days.

This patent is subject to a terminal disclaimer.

(21) Appl. No.: 11/718,220

(22) PCT Filed: Oct. 25, 2005
(Under 37 CFR 1.47)

(86) PCT No.: PCT/JP2005/019954

§ 371 (c)(1),
(2), (4) Date: Aug. 31, 2008

(87) PCT Pub. No.: WO2006/049110

PCT Pub. Date: May 11, 2006

(65) Prior Publication Data

US 2009/0039844 A1 Feb. 12, 2009

(30) Foreign Application Priority Data

Nov. 4, 2004 (JP) ................................ 2004-320182

(51) Int. Cl.
*G05F 1/00* (2006.01)
*H02J 7/00* (2006.01)

(52) U.S. Cl. ....................................... 323/283; 307/150

(58) Field of Classification Search .......... 323/282–285, 323/288; 307/150

See application file for complete search history.

(56) References Cited

U.S. PATENT DOCUMENTS

| | | | | |
|---|---|---|---|---|
| 5,994,950 | A | 11/1999 | Ochi | |
| 6,204,646 | B1 | 3/2001 | Hiramatsu et al. | |
| 6,236,194 | B1 | 5/2001 | Manabe et al. | |
| 6,525,596 | B2 | 2/2003 | Hosono et al. | |
| 6,608,520 | B1 | 8/2003 | Miyazaki | |
| 6,661,279 | B2 | 12/2003 | Yabe | |
| 6,828,766 | B2 * | 12/2004 | Corva et al. | 323/284 |
| 6,919,713 | B2 * | 7/2005 | Hoshino et al. | 323/267 |
| RE39,374 | E | 11/2006 | Manabe et al. | |

(Continued)

FOREIGN PATENT DOCUMENTS

EP 0949739 A2 10/1999

(Continued)

OTHER PUBLICATIONS

Official communication issued in the International Application No. PCT/JP2005/018400, mailed on Dec. 27, 2005.

(Continued)

*Primary Examiner* — Adolf Berhane

(74) *Attorney, Agent, or Firm* — Keating & Bennett, LLP

(57) ABSTRACT

A power supply unit, adapted to provide a predetermined output voltage from its output circuit, compares a feedback voltage associated with the output voltage of the output circuit with a reference voltage so as to control the output circuit. The power supply unit is enabled and disabled in response to an externally supplied operation command signal. The reference voltage is generated by a reference voltage generation circuit, which is operable on the voltage of the operation command signal, and is controllably enabled when the voltage of the operation command signal exceeds a predetermined level, but otherwise disabled. Thus, the reference voltage is stabilized to improve the ripple rejection characteristic of the power supply unit without increasing its current consumption.

8 Claims, 3 Drawing Sheets

U.S. PATENT DOCUMENTS

| | | | | |
|---|---|---|---|---|
| 7,135,825 | B2 * | 11/2006 | Tanabe | 315/308 |
| 7,567,065 | B2 * | 7/2009 | Matsuo et al. | 323/222 |
| 7,626,371 | B2 * | 12/2009 | Hoshino et al. | 323/283 |
| 7,635,969 | B2 * | 12/2009 | Hoshino et al. | 323/277 |
| 7,642,759 | B2 * | 1/2010 | Dobkin | 323/269 |
| 7,652,455 | B2 * | 1/2010 | Demolli | 323/274 |
| 2001/0022527 | A1 | 9/2001 | Hosono et al. | |
| 2005/0127883 | A1 * | 6/2005 | Hoshino et al. | 323/274 |
| 2009/0237051 | A1 * | 9/2009 | Saitoh | 323/282 |

FOREIGN PATENT DOCUMENTS

| | | | |
|---|---|---|---|
| JP | 62-75725 | A | 4/1987 |
| JP | 02-070264 | A | 3/1990 |
| JP | 04-040313 | U | 4/1992 |
| JP | 07-336999 | A | 12/1995 |
| JP | 09-062376 | A | 3/1997 |
| JP | 10-150152 | A | 6/1998 |
| JP | 10-232721 | A | 9/1998 |
| JP | 11-353040 | A | 12/1999 |
| JP | 2000-357018 | A | 12/2000 |
| JP | 2001-084043 | A | 3/2001 |
| JP | 2001-117650 | A | 4/2001 |
| JP | 2001-166837 | A | 6/2001 |
| JP | 2002-373942 | A | 12/2002 |
| JP | 2003-005847 | A | 1/2003 |
| JP | 2003-216247 | A | 7/2003 |
| JP | 2003-224967 | A | 8/2003 |
| WO | 2006/048990 | A1 | 5/2006 |
| WO | 2006/049109 | A1 | 5/2006 |
| WO | 2006/049110 | A1 | 5/2006 |

OTHER PUBLICATIONS

Official communication issued in the International Application No. PCT/JP2005/019950, mailed on Jan. 24, 2006.

Official communication issued in the International Application No. PCT/JP2005/019954, mailed on Jan. 24, 2006.

Taichi Hoshino et al.; "Power Supply Unit and Portable Device"; U.S. Appl. No. 11/718,219, filed Apr. 27, 2007.

Taichi Hoshino et al.; "Power Supply Unit and Portable Device"; U.S. Appl. No. 11/718,223, filed Apr. 27, 2007.

* cited by examiner

POWER SUPPLY UNIT AND PORTABLE DEVICE

BACKGROUND OF THE INVENTION

1. Field of the Invention

This invention relates to an electric power supply unit for providing a predetermined output voltage through conversion of a power supply voltage of a dc power supply such as a battery, and to a portable device equipped with such power supply unit.

2. Description of the Related Art

A power supply unit such as a series regulator typically converts the power supply voltage of a dc power supply to a predetermined output voltage. This power supply unit is required to provide a stable output voltage which is free of ripples that arises from ripple components in the power supply voltage.

This power supply unit is controlled such that the feedback voltage associated with the output voltage is brought to a given reference voltage. Therefore, in order to stabilize the reference voltage, it is inevitable to reject ripple components in the output voltage (referred to as ripple rejection), since the output voltage greatly contributes to the stability of the reference voltage.

The reference voltage is usually generated from the power supply voltage supplied to the power supply unit by a reference voltage generation circuit. As a consequence, the reference voltage contains ripples, which makes it difficult to perform sufficient ripple rejection.

In order to solve this problem, a voltage adjustment circuit (hereinafter referred to as pre-power supply circuit) is provided for stabilizing the power supply voltage. The output voltage of the pre-power supply circuit is supplied as the operating voltage of the reference voltage generation circuit. Japanese Patent No. 2001-84043 (referred to as Patent Document 1) proposes use of a pre-power supply circuit to improve the ripple rejection characteristic of a power supply unit against ripples in the power supply voltage.

However, provision of a pre-power supply circuit entails current consumption thereof, which increases the overall current consumption. A portable device that uses a battery as the power supply particularly requires minimization of current consumption to ensure prolonged use of the battery. From this point, it is not desirable to provide a current consuming pre-power supply circuit.

Moreover, a pre-power supply circuit lowers the power supply voltage a little due to its power consumption. For this reason, the power supply voltage for generating a required reference voltage must be higher in the case where a pre-power circuit is used than in the case where no pre-power circuit is used. That is, the reduced-voltage characteristic of the power supply unit is degenerated. As a consequence, a problem arises then that the minimum permissible level of the power supply voltage of the battery is raised, and accordingly the usable time of the battery is shortened.

SUMMARY OF THE INVENTION

It is, therefore, an object of the present invention to provide a power supply unit having a stabilized reference voltage without increasing its current consumption, and hence having an improved ripple rejection characteristic. It is another object of the invention to provide a portable device equipped with such power supply unit.

A power supply unit in accordance with one aspect of the invention comprises an output circuit for providing a predetermined output voltage obtained by regulating a power supply voltage, an error amplification circuit for comparing a feedback voltage associated with said output voltage with a reference voltage to control said output circuit such that said feedback voltage is brought to said reference voltage, and a reference voltage generation circuit for generating said reference voltage, such that: said error amplification circuit and reference voltage generation circuit are controllably enabled in response to an externally supplied control voltage to provide said output voltage; and said reference voltage generation circuit is operated on the voltage of the said control signal.

A power supply unit in accordance with another aspect of the invention comprises an output circuit for providing a predetermined output voltage obtained by regulating a power supply voltage, an error amplification circuit for comparing a feedback voltage associated with said output voltage with a reference voltage to control said output circuit such that said feedback voltage is brought to said reference voltage, and a reference voltage generation circuit for generating said reference voltage, such that: at least said error amplification circuit and reference voltage generation circuit are controllably enabled or disabled in response to an externally supplied operation command signal to provide said output voltage; said error amplifier is controllably enabled when the voltage of said operation command signal exceeds a predetermined level, and otherwise controllably disabled; and said reference voltage generation circuit, operable on the voltage of said operation command signal, is controllably enabled when the voltage of said operation command signal exceeds said predetermined voltage level, but otherwise controllably disabled.

The power supply unit may be provided with a voltage level detection circuit for determining if the voltage of said operation command signal exceeds said predetermined level to generate a voltage level detection signal, so that the enabled state and disabled state of said reference voltage generation circuit and of error amplifier can be determined by the voltage level detection signal.

A portable device in accordance with one aspect of the invention comprises a battery serving as a power supply for generating a power supply voltage, a power supply unit that includes: an output circuit for providing a predetermined output voltage obtained by regulating said power supply voltage; an error amplification circuit for comparing a feedback voltage associated with said output voltage with a reference voltage to control said output circuit such that said feedback voltage is brought to said reference voltage; and a reference voltage generation circuit for generating said reference voltage, such that: said error amplification circuit and reference voltage generation circuit are controllably enabled in response to an externally supplied control signal to provide said output voltage; and said reference voltage generation circuit, operable on the voltage of said control signal, a controller generating said control signal, and a load receiving said output voltage.

A portable device in accordance with another aspect of the invention comprises a battery serving as a power supply for generating a power supply voltage; a power supply unit that includes: an output circuit for providing a predetermined output voltage obtained by regulating said power supply voltage; an error amplification circuit for comparing a feedback voltage associated with said output voltage with a reference voltage to control said output circuit such that said feedback voltage is brought to said reference voltage; and a reference voltage generation circuit for generating said reference voltage, such that at least said error amplification circuit and reference voltage generation circuit are controllably enabled or disabled in response to an externally supplied operation command signal; said error amplifier is controllably enabled when the voltage of said operation command signal exceeds a predetermined level, and otherwise controllably disabled; and said reference voltage generation circuit, operable on the voltage of said operation command signal, is controllably enabled when the voltage of said operation command signal exceeds said predetermined voltage level, but otherwise controllably disabled, a controller generating said operation command signal, and a load receiving said output voltage.

A portable device in accordance with a further aspect of the invention comprises a battery serving as a power supply for generating a power supply voltage, a power supply unit that includes: an output circuit for providing a predetermined output voltage obtained by regulating said power supply voltage; an error amplification circuit for comparing a feedback voltage associated with said output voltage with a reference voltage to control said output circuit such that said feedback voltage is brought to said reference voltage; and a reference voltage generation circuit for generating said reference voltage, such that: at least said error amplification circuit and reference voltage generation circuit are controllably enabled or disabled in response to an externally supplied operation command signal to provide said output voltage; said error amplifier is controllably enabled when the voltage of said operation command signal exceeds a predetermined level, and otherwise controllably disabled; and said reference voltage generation circuit, operable on the voltage of said operation command signal, is controllably enabled when the voltage of said operation command signal exceeds said predetermined voltage level, but otherwise controllably disabled; a smoothing circuit for smoothing said power supply voltage before it is provided as said operation command signal, and a load receiving said output voltage.

In the present invention, a control signal such as an operation command signal supplied to the power supply unit is also used to provide the operating voltage of the reference voltage generation circuit. This control signal (operation command signal) may be supplied from a controller that includes a computer, for example. Alternatively, the reference voltage generation circuit may be supplied with the power supply voltage via a smoothing circuit for smoothing the power supply voltage. Thus, the control signal has little ripple components and stable when it is supplied to the reference voltage generation circuit. Since a stable reference voltage is generated from the reference voltage generation circuit, the power supply unit has an improved ripple rejection characteristic.

It is noted that the reduced-voltage characteristic will not be deteriorated nor the current consumption will not increase, since no pre-power circuit is used. Therefore, the battery can be continuously used for a longer period of time in the inventive power supply unit than in conventional power supply units.

Moreover, in addition to providing enabling and disabling commands to the power supply unit, the control signal (operation command signal) is also used to provide the operating voltage of the reference voltage generation circuit, so that no extra terminal is needed for the reference voltage generation circuit. This helps minimize the number of terminals of the transistorized IC power supply unit.

DETAILED DESCRIPTION OF PREFERRED EMBODIMENTS

Preferred embodiments of a power supply unit and a portable device of the invention will now be described in detail with reference to the accompanying drawings. The power supply unit of the invention may be referred to as semiconductor device in the sense that it is fabricated in the form of a semiconductor LSI.

Figure 1:
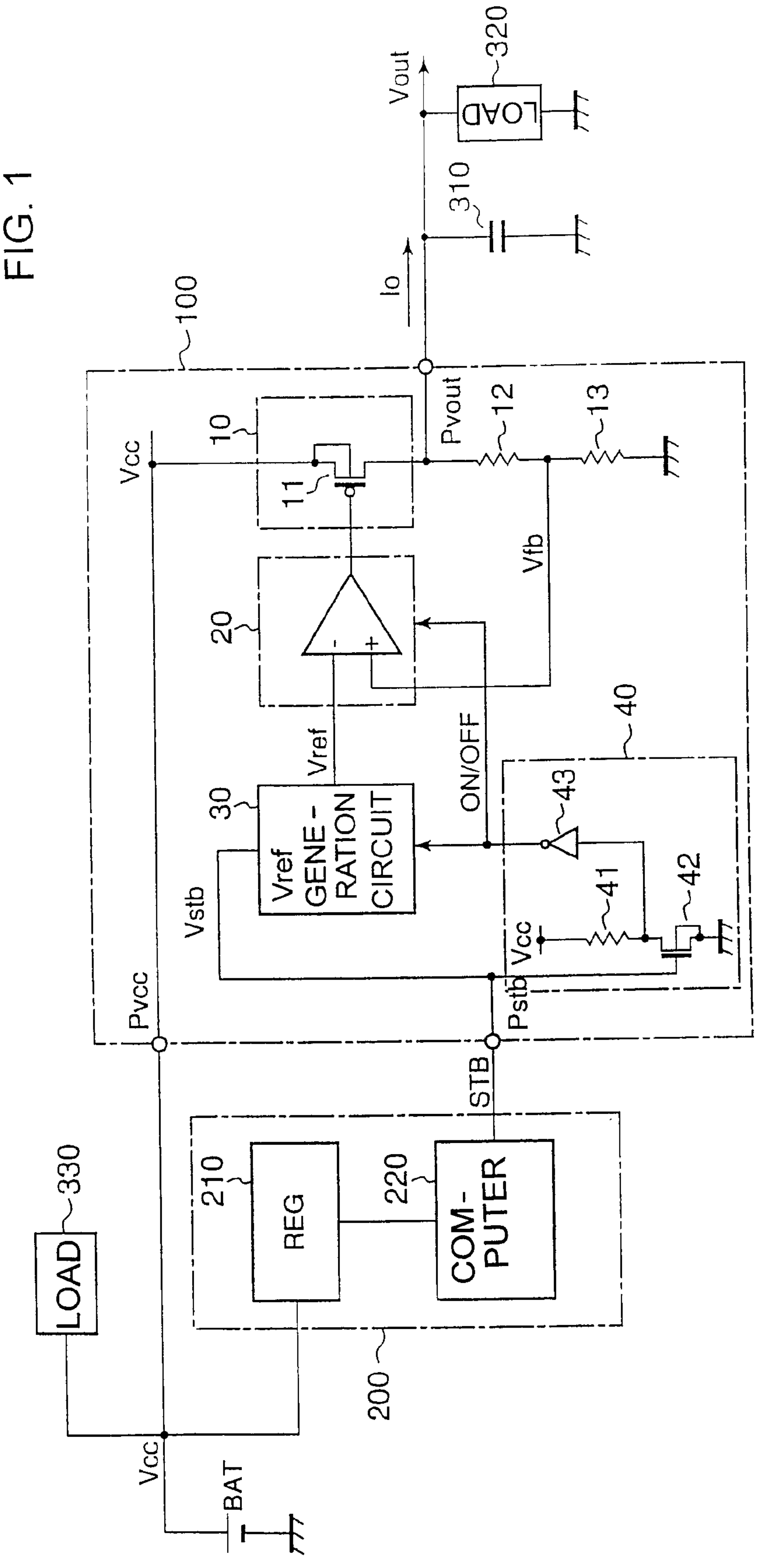
FIG. 1 is a diagram showing an arrangement of a power supply unit in accordance with a first embodiment of the invention and a portable device utilizing the power supply unit.

Referring to FIG. 1, there is shown an arrangement of a power supply unit in accordance with a first embodiment of the invention and a portable device utilizing the power supply unit.

As shown in FIG. 1, a battery BAT serving as a power supply generates a power supply voltage Vcc. The level of the power supply voltage Vcc changes with the charging/discharging status of the battery BAT. The power supply voltage Vcc contains ripple components in dependence on the magnitude of a load connected.

This power supply voltage Vcc is inputted into the power supply unit 100 via a power supply voltage input terminal Pvcc. In the example shown herein, the output circuit 10 of the power supply unit 100 is provided in the form of a series regulator that contains an output transistor 11. The output circuit 10 regulates the power supply voltage Vcc to provide a predetermined output voltage Vout in accordance with a control signal. The output transistor 11 can be a P-type MOS transistor. Although the output circuit 10 is shown in FIG. 1 to be a series regulator utilizing the output transistor 11, it is not limited to the series regulator. For example, it can be a switching type output circuit.

The output voltage Vout of the power supply unit 100 is supplied to an output smoothing capacitor 310 and a load 320 via an output terminal Pvout. Symbol Io represents the output current outputted from the power supply unit 100. The output voltage Vout is divided by voltage dividing resistors 12 and 13 to generate a feedback voltage Vfb.

An error amplification circuit 20 has an error amplifier for comparing the feedback voltage Vfb with a reference voltage Vref, and, based on the comparison, controls the output transistor 11 so as to bring the feedback voltage Vfb to the reference voltage Vref.

A reference voltage generation circuit 30 is operable on the voltage inputted thereto and generates a reference voltage Vref of a predetermined level based on the operational voltage. The reference voltage generation circuit 30 is preferably provided in the form of a band-gap type constant voltage circuit so that it can output as much stable reference voltage Vref as possible. However, when ripple components are contained in the operating voltage, it is difficult to sufficiently suppress the ripple components in the reference voltage Vref solely by the reference voltage generation circuit 30. Therefore, it is necessary to reduce the ripple components in the operating voltage before it is inputted into the reference voltage generation circuit 30.

The power supply unit 100 is supplied, via an operation command signal input terminal Pstb, with an operation command input signal STB for controllably enabling or disabling the power supply unit 100. The operation command signal STB may be referred to as standby signal. In the disabled state, the power supply unit 100 provides an output voltage Vout of zero volt and an output current Io of zero level, and the current consumption of the power supply unit 100 is reduced to zero or an extremely small minimum level.

The operation command signal STB has either a HIGH (H) level or a LOW (L) level. The power supply unit 100 is enabled when the operation command signal STB is at H level, and disabled when the operation command signal STB is at L level. In the example shown herein, the error amplification circuit 20 and the reference voltage generation circuit 30 are enabled or disabled in accordance with the level of the operation command signal STB.

The operation command signal STB is supplied from a controller 200. The operation command signal STB has an operation command voltage Vstb (in the range of about 1.5-3V for example) when it is at H level, and has e.g. the ground potential when it is at L level. This operation command voltage Vstb is inputted into the reference voltage generation circuit 30 as the operating voltage.

A voltage level detection circuit 40 detects and determine whether or not the voltage level of the operation command signal STB exceeds a predetermined voltage to output a level detection signal. In dependence on the level detection signal, the reference voltage generation circuit 30 and the error amplification circuit 20 are enabled or disabled.

The voltage level detection circuit 40 has a resistor 41 and an N-type MOS transistor 42 connected in series in the order mentioned between the power supply voltage Vcc and the ground. The operation command signal STB is applied to the gate of the N-type MOS transistor 42. The voltage at the series connection node of the resistor 41 and the N-type MOS transistor 42 is inverted by an inverter 43 and outputted as a detection voltage.

It is noted that the voltage level detection circuit 40 serves as a voltage level conversion circuit, so that this circuit can be omitted if the operational states of the error amplification circuit 20 and the reference voltage generation circuit 30 can be controlled by the voltage level of the operation command signal STB.

The controller 200 has a computer 220 for controlling the respective components of the portable device. The controller 200 also has a voltage adjustment circuit (or regulator) 210. This regulator 210 adjusts the power supply voltage Vcc to the voltage required by the computer 220 before supplying it to the computer 220. In the event when the power supply voltage Vcc contains ripple components, the computer 220 is supplied with a stable voltage having only suppressed ripple components.

Since the computer 220 operates on the stable voltage, the operation command voltage Vstb of the operation command signal STB is also stable, suffering only reduced ripples.

The power supply voltage Vcc is also supplied to various loads within the portable device which are collectively represented by a load block 330.

In the portable device of FIG. 1, the controller 200 generates an operation command signal STB that undergoes a step rise in voltage. This signal pulls up the output level of the detection circuit 4 from zero to H level. In response to this change, the error amplification circuit 20 and the reference voltage generation circuit 30, and hence the power supply unit 100, will be enabled.

At the same time, the operation command voltage Vstb is supplied to the reference voltage generation circuit 30 to generate the reference voltage Vref. Then, the error amplification circuit 20 and the output transistor 11 undergo constant voltage operation based on the reference voltage Vref, allowing the power supply unit 100 to output the predetermined output voltage Vout.

Since this reference voltage Vref is generated by the reference voltage generation circuit 30 in response to the inputted operation command voltage Vstb having only suppressed ripple components, the reference voltage Vref contains little ripple components. Accordingly, even if the ripple components are contained in the power supply voltage Vcc, the level of the ripple components contained in the output voltage Vout is extremely reduced.

Thus, the ripple rejection characteristic of the power supply unit 100 improves, since the operation command signal STB supplied from the controller 200 is used as the operating voltage of the reference voltage generation circuit 30 of the power supply unit 100.

It should be appreciated that, unlike conventional power supply units, no pre-power circuit is needed, so that the reduced-voltage characteristic can be improved without increasing the current consumption. Therefore, continuously usable time of the battery BAT can be extended.

It should be also appreciated that, besides the operation command signal STB is used as the proper signal to enable and disenable the power supply unit 100, the signal STB is also used to provide the operating voltage of the reference voltage generation circuit 30, which helps minimize the number of terminals of the power supply unit to be embedded in an IC chip.

Figure 2:
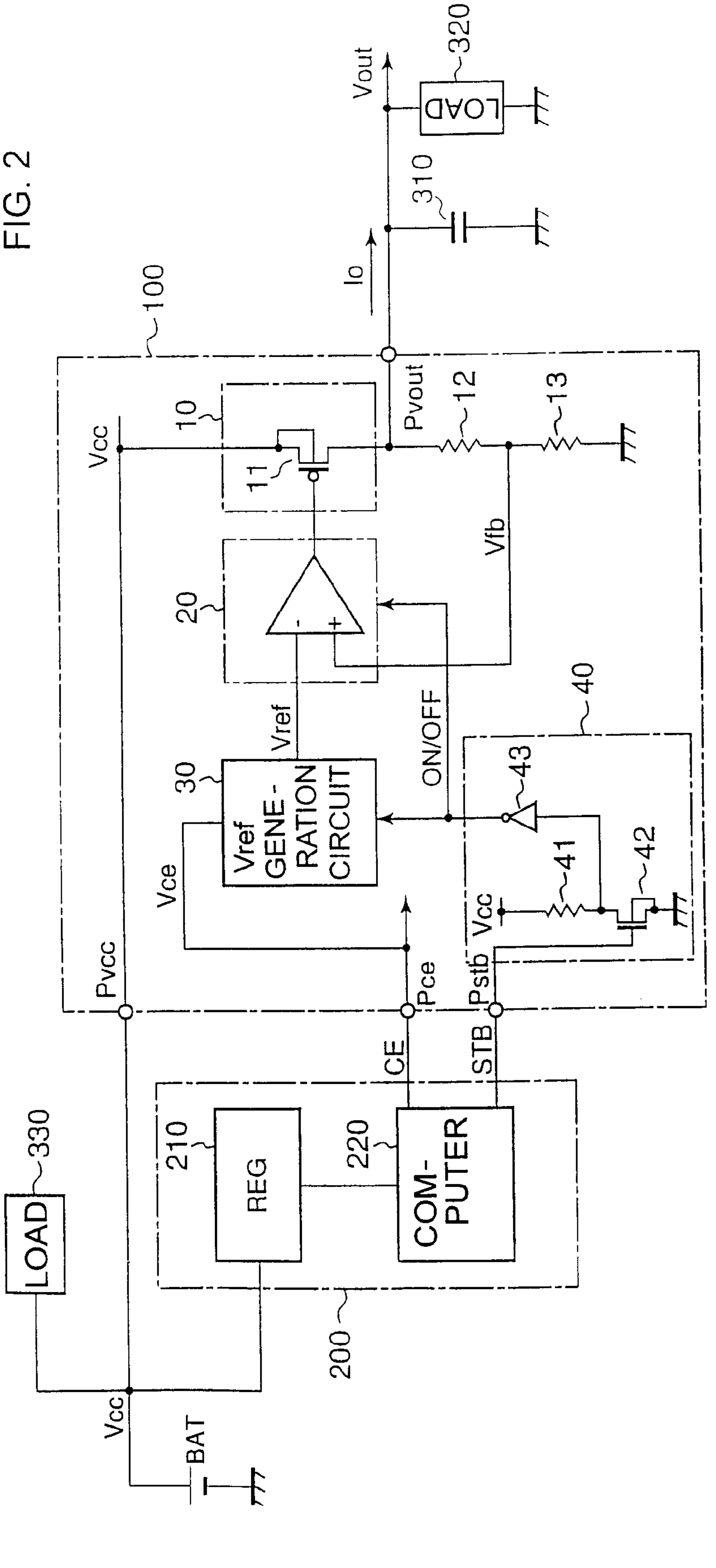
FIG. 2 is a diagram showing an arrangement of a power supply unit in accordance with a second embodiment of the invention and a portable device using the power supply unit.

Referring to FIG. 2, there is shown an arrangement of a power supply unit in accordance with a second embodiment of the invention and a portable device utilizing the power supply unit.

In the second embodiment shown in FIG. 2, there is provided in addition to the operation command signal STB a control signal (referred to as chip select signal or chip enable signal) CE for controllably holding the power supply unit 100 in the enabled state to provide the output voltage Vout. The chip select signal CE is inputted via a chip selection signal input terminal Pce.

The chip select signal CE has H level or L level. The power supply unit 100 is controllably held in the enabled state when the chip select signal CE is at H level, and controllably held in the disabled state when the chip select signal CE is at L level.

The chip select signal CE is supplied from the controller 200. The chip select signal CE has a chip select voltage Vce (in the range of about 1.5-3 V, for example) when it is at H level, and has the grand potential when it is at L level. The chip select voltage Vce is inputted into the reference voltage generation circuit 30 as the operating voltage. The chip select voltage Vce of the chip select signal CE also contains little ripple components and is stable.

The control signal can be substituted for by any signal that can hold the power supply unit 100 in the enabled state to provide the output voltage Vout. For example, it can be a reset signal.

In the portable device of FIG. 2, the controller 200 generates a chip select signal CE whose voltage level goes up in a step-like manner. This signal holds the power supply unit 100 in the enabled state to provide the output voltage Vout.

At the same time, the chip select voltage Vce is supplied to the reference voltage generation circuit 30 as the operating voltage thereof.

Since the operation command signal STB generated by the controller 200 undergoes a step rise in voltage, the voltage level detection circuit 40 outputs an H-level detection signal.

As a consequence, the error amplification circuit 20 and the reference voltage generation circuit 30 to enable the power supply unit 100.

Accordingly, the reference voltage generation circuit 30 generates the reference voltage Vref, and, based on the reference voltage Vref, the error amplification circuit 20 and the output transistor 11 undergo constant-voltage operation. As a result, the power supply unit 100 provides the predetermined output voltage Vout.

The rest of the arrangement of the second embodiment shown in FIG. 2 is the same as that of FIG. 1. The same result can be obtained in the first and second embodiments.

Figure 3:
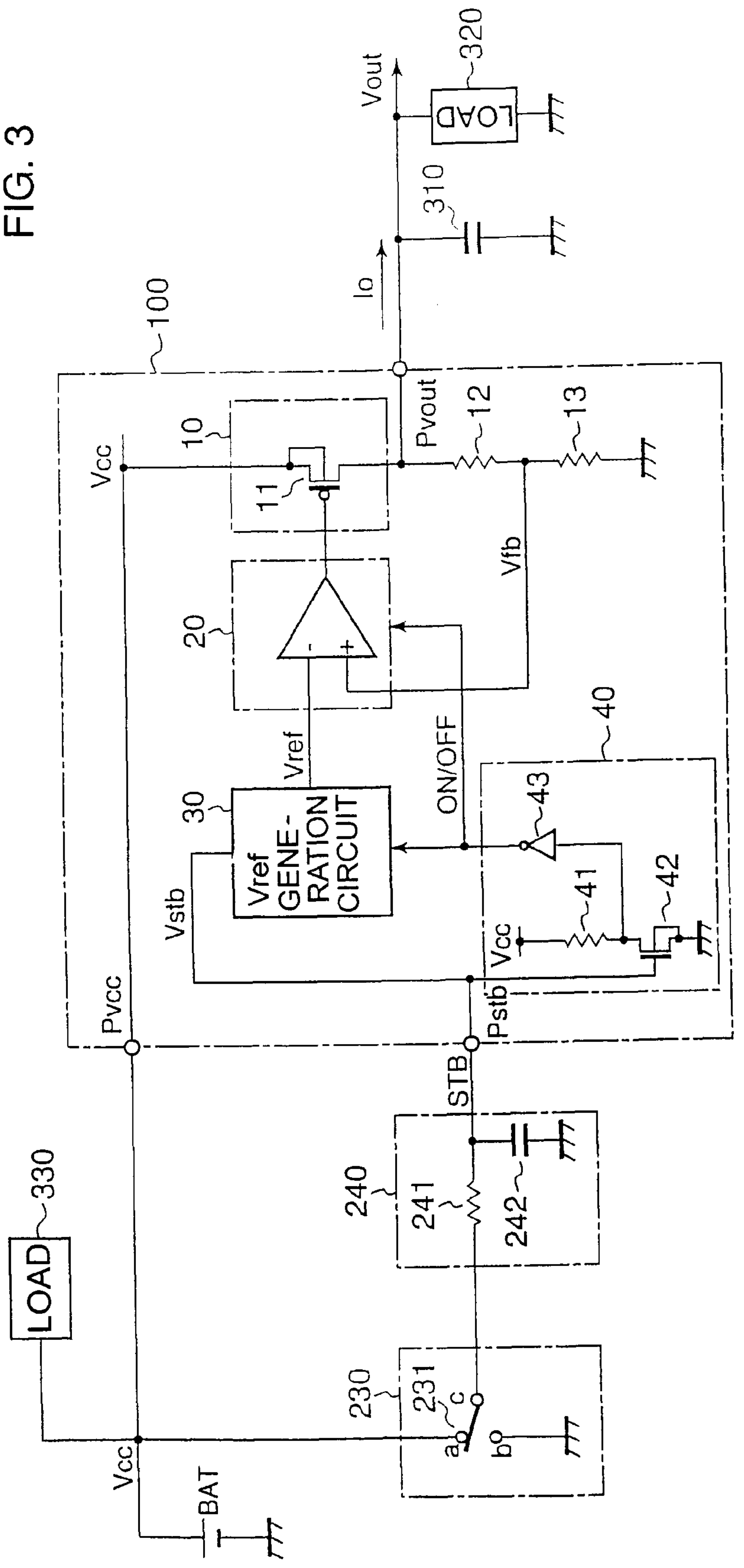
FIG. 3 is a diagram showing an arrangement of a power supply unit in accordance with a third embodiment of the invention and a portable device using the power supply unit.

Referring to FIG. 3, there is shown an arrangement of a power supply unit in accordance with a third embodiment of the invention and a portable device utilizing the power supply unit.

The third embodiment of FIG. 3 differs from the first shown in FIG. 1 in that a changeover switch circuit 230 and a smoothing circuit 240 are provided in place of the controller 200 (FIG. 1). The rest of the arrangement shown in FIG. 3 is the same as in FIG. 1.

The changeover switch circuit 230 has a changeover switch 231. The common terminal "c" of the changeover switch 231 is selectively connected to either one of a first terminal "a" connected to the power supply voltage Vcc or a second terminal "b" connected to the ground.

The smoothing circuit 240 has a resistor 241 and a capacitor 242 for smoothing the power supply voltage Vcc before it is outputted as the operation command signal STB.

When the changeover switch 231 is connected to the second terminal "b", the operation command signal STB has L level. Then, the power supply unit 100 is held in the disabled state.

As the changeover switch 231 is switched to the first terminal "a", the power supply voltage Vcc is inputted into the smoothing circuit 240. The ripple components contained in the power supply voltage Vcc is attenuated by the smoothing effect of the smoothing circuit 240, and the resultant rippleless operation command signal STB is supplied to the power supply unit 100.

The smoothing capability of the smoothing circuit 240 depends on the resistance of the resistor 241 and the capacitance of the capacitor 242. It is noted that the operation command signal STB results in an extremely small current (in the range from a few micro-ampere to a few 10 micro-ampere, for example) through the smoothing circuit 240, so that the resistance of the resistor 241 can be made large and the capacitance of the capacitor 242 small. Accordingly, the smoothing circuit 240 of the invention can be advantageously miniaturized for use in a portable device.

Suppose now that a smoothing circuit that has the same smoothing capability as the smoothing circuit 240 is provided in the current path for flowing a load current (of several 100 mA, for example) for the loads 320 and 330. In this arrangement, it is necessary to reduce the voltage drop across the resistor of the smoothing circuit. That is, the resistor must be of extremely small resistance while the capacitor must be of extremely large capacitance. This arrangement, therefore, cannot be applied to portable devices that must be small in size.

It should be appreciated that the third embodiment can provide the same result as the first embodiment of FIG. 1, and, moreover, it can be extremely simplified in structure and miniaturized.

It is noted that the power supply voltage Vcc may be directly supplied to the smoothing circuit 240 without using the changeover switch circuit 230. In this case, the changeover switch circuit 230 can be omitted.

The smoothing circuit 240 is not limited to a resistor coupled with a capacitor as shown above. The smoothing circuit can be arbitrarily formed using a coil or a coil and a capacitor to have smoothing capability.

A power supply unit of the invention is controllably held in an enabled state or disabled state in accordance with an externally supplied operation command signal. The reference voltage generation circuit for generating a reference voltage is operable on the voltage of the operation command signal and controllably enabled when the voltage level of the operation command signal exceeds a predetermined voltage level, and otherwise controllably disabled. Since the power supply unit is capable of stabilizing the reference voltage without increasing the current consumption, it has an improved ripple rejection characteristic and can be effectively utilized in a portable device.

The invention claimed is:

1. A power supply unit, comprising:

an output circuit arranged to provide a predetermined output voltage obtained by regulating a power supply voltage, an error amplification circuit arranged to compare a feedback voltage associated with said output voltage with a reference voltage to control said output circuit such that said feedback voltage is brought to said reference voltage, and a reference voltage generation circuit including a constant voltage circuit, said reference voltage generation circuit receiving an operating voltage to generate said reference voltage, such that:

said error amplification circuit and reference voltage generation circuit are controllably enabled to provide said output voltage in response to an externally supplied control signal having a voltage that is more stable than said power supply voltage; and said reference voltage generation circuit is supplied with, as said operating voltage, the more stable voltage of the said control signal to generate said reference voltage.

2. A power supply unit, comprising:

an output circuit arranged to provide a predetermined output voltage obtained by regulating a power supply voltage, an error amplification circuit arranged to compare a feedback voltage associated with said output voltage with a reference voltage to control said output circuit such that said feedback voltage is brought to said reference voltage, and a reference voltage generation circuit including a constant voltage circuit, said reference voltage generation circuit receiving an operating voltage to generate said reference voltage, such that:

at least said error amplification circuit and reference voltage generation circuit controllably enabled or disabled in response to an externally supplied operation command signal having a voltage that is more stable than said power supply voltage;

said error amplifier is controllably enabled when the voltage of said operation command signal exceeds a predetermined level, and otherwise controllably disabled; and said reference voltage generation circuit is supplied with, as said operating voltage, the more stable voltage of said operation command signal, and is controllably enabled to generate said reference voltage when the voltage of said operation command signal exceeds said predetermined level, but otherwise controllably disabled.

3. The power supply unit according to claim 2, further comprising a voltage level detection circuit arranged to determine if the voltage of said operation command signal exceeds said predetermined level to generate a voltage level detection signal, wherein the enabled state and disabled state of said reference voltage generation circuit and of error amplifier are determined by said voltage level detection signal.

4. A portable device comprising:

a battery serving as a power supply arranged to generate a power supply voltage, a power supply unit that includes:

an output circuit arranged to provide a predetermined output voltage obtained by regulating said power supply voltage;

an error amplification circuit arranged to compare a feedback voltage associated with said output voltage with a reference voltage to control said output circuit such that said feedback voltage is brought to said reference voltage; and a reference voltage generation circuit including a constant voltage circuit, said reference voltage generation circuit receiving an operating voltage to generate said reference voltage, such that:

said error amplification circuit and reference voltage generation circuit are controllably enabled to provide said output voltage in response to an externally supplied control signal having a voltage that is more stable than said power supply voltage; and said reference voltage generation circuit is supported with, as said operating voltage, the more stable voltage of said control signal to generate said reference voltage, a controller generating said control signal, and a load receiving said output voltage.

5. A portable device, comprising:

a battery serving as a power supply arranged to generate a power supply voltage, a power supply unit that includes:

an output circuit arranged to provide a predetermined output voltage obtained by regulating said power supply voltage;

an error amplification circuit arranged to compare a feedback voltage associated with said output voltage with a reference voltage to control said output circuit such that said feedback voltage is brought to said reference voltage; and a reference voltage generation circuit including a constant voltage circuit, said reference voltage generation circuit receiving an operating voltage to generate said reference voltage, such that:

at least said error amplification circuit and reference voltage generation circuit are controllably enabled or disabled in response to an externally supplied operation command signal having a voltage that is more stable than said power supply voltage;

said error amplifier is controllably enabled when the voltage of said operation command signal exceeds a predetermined level, but otherwise controllably disabled; and said reference voltage generation circuit is supplied with, as said operating voltage, the more stable voltage of said operation command signal, and to generate said reference signal is controllably enabled when the voltage of said operation command signal exceeds said predetermined voltage level, but otherwise controllably disabled, a controller generating said operation command signal, and a load receiving said output voltage.

6. The portable device according to claim 5, wherein:

said power supply unit includes a voltage level detection circuit arranged to determine if the voltage of said operation command signal exceeds said predetermined level to generate a voltage level detection signal; and the enabled state and disabled state of said reference voltage generation circuit and of error amplifier are determined by said voltage level detection signal.

7. A portable device, comprising:

a battery serving as a power supply arranged to generate a power supply voltage, a power supply unit that includes:

an output circuit arranged to provide a predetermined output voltage obtained by regulating said power supply voltage;

an error amplification circuit arranged to compare a feedback voltage associated with said output voltage with a reference voltage to control said output circuit such that said feedback voltage is brought to said reference voltage; and a reference voltage generation circuit including a constant voltage circuit, said reference generation circuit receiving an operating voltage to generate said reference voltage, such that:

at least said error amplification circuit and reference voltage generation circuit are controllably enabled or disabled in response to an externally supplied operation command signal having a voltage that is more stable than said power supply voltage;

said error amplifier is controllably enabled when the voltage of said operation command signal exceeds a predetermined level, but otherwise controllably disabled; and said reference voltage generation circuit is supplied with, as said operating voltage, the more stable voltage of said operation command signal, and is controllably enabled to generate said reference voltage when the voltage of said operation command signal exceeds said predetermined voltage level, but otherwise controllably disabled, a smoothing circuit arranged to smooth said power supply voltage before it is provided as said operation command signal, and a load receiving said output voltage.

8. The portable device according to claim 7, wherein:

said power supply unit includes a voltage level detection circuit arranged to determine if the voltage of said operation command signal exceeds said predetermined level to generate a voltage level detection signal; and the enabled state and disabled state of said reference voltage generation circuit and of error amplifier are determined by said voltage level detection signal.

* * * * *